Patented Mar. 5, 1935

1,993,036

UNITED STATES PATENT OFFICE 1,993,036

SYNTHETIC RESIN AND METHOD OF PRODUCING

Irvin W. Humphrey, Wilmington, Del., assignor to Hercules Powder Company, Wilmington, Del., a corporation of Delaware No Drawing. Application September 11, 1933, Serial No. 688,988

14 Claims. (Cl. 260—8)

This invention relates to a new composition of matter and method for its production.

In accordance with this invention a novel synthetic resin, having characteristics rendering it valuable for use variously in the commercial arts, is prepared by reacting together a pinene, such as alpha-pinene, beta-pinene, etc., or a mixture thereof, maleic anhydride and rosin or abietic acid. The reaction involved is probably explained on the basis of the unsaturated bond of the maleic anhydride reacting with the unsaturated bonds of both the pinene and the abietic acid. The new composition is a highly acidic material of complex nature.

In preparing the synthetic resin in accordance with my invention the reagents may be reacted in widely varying proportions depending upon the physical characteristics desired for the resin product with consideration to the use to which it is to be put. Generally speaking, it is desirable to employ maleic anhydride approximately in the proportion necessary to satisfy the reactivity of the pinene and the abietic acid with maleic anhydride. Thus, for example, with use of relatively large amounts of pinene, the product is soft and tough, with more abietic acid in proportion to pinene, the product is hard and brittle and so on, it being clear that by varying the proportions and amounts of the reagents products having varying characteristics may be produced. As illustrative, for example, a pinene, such as alpha- or beta-pinene, may be used within the range 0.1 to 0.9 moles, maleic anhydride within about the range 0.2 to 2.0 moles and abietic acid within about the range 0.1 to 0.9 moles.

The pinenes are terpene hydrocarbons possessing no conjugated system of unsaturated double bonds. Alpha-pinene is the principal constituent of turpentine and boils at about 153–157° C. It may be obtained by fractionation of turpentine. Beta-pinene (b. p. about 162–166° C.) occurs in French and other turpentines and may be obtained by fractionation of this material. As equivalents for the pure hydrocarbons, terpene cuts relatively rich in the hydrocarbons may be used. Thus, a terpene cut boiling within about the range 150–165° C. will be relatively rich in alpha-pinene. A terpene cut boiling within about the range 160–170° C. may be relatively rich in beta-pinene, while perhaps also containing some alpha-pinene. Such terpene cuts will contain various other reactive terpenes and impurities, which, however, will not interfere in carrying out the process of this invention, and which can be readily separated from the final product if non-reactive.

In preparing the improved synthetic resin the reagents will be reacted in the presence of heat. However, it will be expressly understood that any means for effecting the reaction is contemplated as within the scope of this invention. Any suitable temperature may be used, though a temperature within the range (say) about 150–250° C. is desirable. The reaction will usually be carried out under atmospheric pressure, but with variations of temperature procedure under reduced or super-pressure will obviously be within the scope of my invention. The production of the resin in accordance with this invention may be carried out in any suitable apparatus, as any suitable container in which the reagents may be heated. On completion of the reaction any volatile unreacted matter may be removed or separated from the product by the application of a vacuum to the reaction mass before cooling. The reactants may be all mixed and heated to reaction temperature together, or the molten maleic anhydride may be added to the hot pinene-rosin mixture, or vice-versa. If desired, partial reaction between the maleic anhydride and either the pinene or rosin may first be effected, and the remaining ingredient added subsequently.

As a specific illustration, for example, 100 parts by weight of alpha-pinene, 165 parts of abietic acid and 98 parts of maleic anhydride are heated together at a temperature of approximately 200° C. for about 3 hours. The pressure on the reaction mass is then reduced to about 15 mm. of mercury and any unreacted maleic anhydride and the inert ingredients associated with the excess pinene are distilled off.

The reaction product obtained by the above procedure will be found to have a direct acid number of about 250, saponification value of about 370, melting point (drop method) of about 85° C. and a rhodanometric iodine value of about 25. The acid and saponification values as well as melting point and rhodanometric iodine value will vary considerably, depending upon the relative proportions of pinene to rosin, etc., also upon temperatures and pressures employed when removing any unreacted material after the reaction.

As illustrative of various amounts of the several reagents which may be reacted to produce resins in accordance with this invention, for example, the reagents may be reacted in the various proportions given in the following table:

| Alpha- or beta-pinene | Rosin | Maleic anhydride |
|---|---|---|
| Parts by weight | Parts by weight | Parts by weight |
| 188 | 20 | 98 |
| 175 | 42 | 98 |
| 150 | 83 | 98 |
| 50 | 250 | 98 |

The above proportions of rosin and maleic anhydride may also be kept constant, while increasing the proportion of pinene over that shown above.

The several reagents in, for example, the proportion given in the above table may be reacted in any suitable container, at a temperature (say) within the range 175° C.–250° C. for (say) one to five hours. Volatile unreacted matter may, as has been indicated, be removed on completion of the reaction by reducing the pressure and, if desired, increasing the temperature in the reaction mass.

In place of pinene and rosin as separate ingredients of the reaction mixture, the crude oleoresin exuded from the living pine tree may be treated directly with maleic anhydride. Thus, for example, 102 parts of oleo-resin and 45 parts of maleic anhydride may be heated at 180°–190° C. for about 3 hours to give a highly acidic, resinous product. Also, the crude extract of terpenes from pine wood may be used, preferably after removal of the solvent employed in extraction. These crude mixtures of rosin, pinenes, pine oil, and various other terpene compounds may be heated, usually at about 150°–250° C., with maleic anhydride in the proportion of about 0.8 mol. maleic anhydride per mol. of total terpene compounds present for from two to eight hours. The non-reacted material is then distilled off, leaving a highly acidic resinous product.

The product in accordance with this invention will be found to be a highly acidic resin, capable, for example, of reacting with alcohols, as, for example, polyhydric alcohols, to yield synthetic gums or resins which have characteristics making them highly desirable for use, for example, in varnishes, lacquers, etc., etc.

As an example of the esterification of the product obtained in the specific illustration above with a polyhydric alcohol the following is illustrative: About 100 parts by weight of the above reaction product and 58 parts of glycerol are heated at a temperature of 210° C. for 6 hours. The resulting resin has an acid value of 40 and a melting point (drop method) of approximately 55° C. It is highly desirable for use in lacquers and varnishes. Drying or semi-drying oils or their acids may be added.

Esterification with monohydric alcohols may likewise be carried out, in the case of low-boiling alcohols preferably under pressure.

It will be understood that in producing the compositions comprising this invention abietic acid as such may be used or rosin, either wood or gum, preferably high in abietic acid content may be used equivalently. The rosin may have been previously isomerized as by heat-treating or contacting with acids which induce isomerization.

It is also contemplated to use other compounds containing the abietyl radical or, for example, abietic acid esters, in place of abietic acid. When an ester of abietic acid is employed the acidity of the reacton product is lower due to the fact that one carboxyl group is esterified. Suitable esters are those from any monohydric or polyhydric alcohol such as methyl, ethyl, propyl, butyl, bornyl alcohol, etc., abietanol, stearol, glycol, or glycerol, etc. Other compounds containing the abietyl radical such as abietyl alcohol, the various abietenes contained in rosin oil, etc., may also be used in accordance with this invention in place of abietic acid. When abietyl alcohol is used, the resulting resin will contain free hydroxyl groups which may be esterified with organic acids as, for example, phthalic, abietic, hydrogenated abietic, acetic, succinic, drying oil fatty acids, stearic acid, etc.

As a specific illustration, for example, of the use of an ester of abietic acid, 100 parts by weight of alpha-pinene, 158 parts of methylabietate and 98 parts of maleic anhydride are heated together with a temperature of about 200° C. for three hours. The pressure is then reduced to 15 mm. of mercury and the excess of maleic anhydride and the inert ingredients associated with the pinene are removed.

The acidic resin herein disclosed of its esters may be hydrogenated if it is desired to saturate any double bonds which remain. The product may be contacted with hydrogen under about 5–500 atmospheres pressure with a hydrogenation catalyst such as activated platinum, palladium, nickel, cobalt, copper-nickel, copper-chromite, etc. With a precious metal catalyst, temperatures below 125° C. will be normally used, the product being dissolved in a suitable solvent. In using a base metal catalyst the reactants will be usually heated at a temperature of about 150–250° C. Thus, for example, 200 parts of the alpha-pinene-rosin-maleic anhydride condensate described above may be hydrogenated by agitating it with 5 parts of an activated nickel catalyst, at a temperature of 180–200° C. for two hours under 200 atmospheres hydrogen pressure.

It will also be understood that maleic acid is contemplated as an operable equivalent of maleic anhydride in the reaction within the scope of this invention and within the purview of the claims hereinafter set forth. The use of maleic anhydride, however, is distinctly preferred.

What I claim and desire to protect by Letters Patent is:

1. A synthetic resin comprising the reaction product of a pinene, maleic anhydride, and a compound containing the abietyl radical.

2. A synthetic resin comprising the reaction product of alpha-pinene, maleic anhydride, and a compound containing the abietyl radical.

3. A synthetic resin comprising the reaction product of beta-pinene, maleic anhydride, and a compound containing the abietyl radical.

4. A synthetic resin comprising the reaction product of a pinene, maleic anhydride, and abietic acid.

5. A synthetic resin comprising the reaction product of alpha-pinene, maleic anhydride, and rosin.

6. A synthetic resin comprising the reaction product of beta-pinene, maleic anhydride, and rosin.

7. A synthetic resin comprising the reaction product of a pinene, maleic anhydride, and an abietic acid ester.

8. A synthetic resin comprising the reaction product of alpha-pinene, maleic anhydride, and an abietic acid ester.

9. A synthetic resin comprising the reaction product of beta-pinene, maleic anhydride, and an abietic acid ester.

10. The method of producing a synthetic resin which includes reacting a pinene, maleic anhydride, and a compound containing the abietyl radical and of a character such that the abietyl radical is available for reaction.

11. The method of producing a synthetic resin which includes reacting in the presence of heat a pinene, maleic anhydride, and a compound containing the abietyl radical, said compound being of a character such that the abietyl radical is available for reaction.

12. The method of producing a synthetic resin which includes reacting at a temperature of about 150° C.–250° C., a pinene, maleic anhydride, and a compound containing the abietyl radical, said compound being of a character such that the abietyl radical is available for reaction.

13. A synthetic resin comprising the reaction product of a terpene cut boiling within the range about 150° C. to about 165° C. and composed principally of alpha-pinene with maleic anhydride and rosin.

14. The method of producing a synthetic resin which includes reacting at a temperature of about 150° C.–250° C., a terpene cut boiling within the range about 150° C.–165° C. and composed principally of alpha-pinene with maleic anhydride and rosin.

IRVIN W. HUMPHREY.